United States Patent
Nakagawa (10) Patent No.: US 12,277,776 B2
(45) Date of Patent: Apr. 15, 2025

(54) VEHICLE COMMUNICATION SYSTEMS AND METHODS FOR DETECTING AND CAPTURING RELEVANT OBJECT DATA

(71) Applicant: Toyota Motor Engineering & Manufacturing North America, Inc., Plano, TX (US)

(72) Inventor: Masashi Nakagawa, Sunnyvale, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 907 days.

(21) Appl. No.: 17/145,717

(22) Filed: Jan. 11, 2021

(65) Prior Publication Data
US 2022/0222473 A1 Jul. 14, 2022

(51) Int. Cl.
| | |
|---|---|
| *G06K 9/00* | (2022.01) |
| *B60W 40/08* | (2012.01) |
| *G06F 16/435* | (2019.01) |
| *G06F 16/45* | (2019.01) |
| *G06F 18/24* | (2023.01) |

(Continued)

(52) U.S. Cl.
CPC ............. *G06V 20/58* (2022.01); *B60W 40/08* (2013.01); *G06F 16/435* (2019.01); *G06F 16/45* (2019.01); *G06F 18/24* (2023.01); *G07C 5/008* (2013.01); *B60W 2420/403* (2013.01); *B60W 2540/01* (2020.02); *B60W 2540/225* (2020.02)

(58) Field of Classification Search
CPC . G06T 2207/30236; G06T 2207/30248; G06T 2207/30252; G06T 2207/30256; G06T 2207/30261; G06T 2207/30264; G06T 2207/30268; G06T 7/254; G06V 20/54; G06V 20/56; G06V 20/58; G06V 20/59; G06V 2201/08; G06F 3/013; G06F 16/435; G06F 16/45; G06F 18/24; G06F 16/55; G08B 13/19606; G08B 13/19608; G07C 5/008; B60R 21/01538; B60W 40/08; B60W 2420/42; B60W 2540/01; B60W 2540/225; A61B 5/18; A61B 2034/2065; A61B 2034/2057
See application file for complete search history.

(56) References Cited

U.S. PATENT DOCUMENTS

| | | | |
|---|---|---|---|
| 11,312,300 B1* | 4/2022 | Ganlath | ................. G06V 20/56 |
| 2017/0308551 A1* | 10/2017 | Nomura | ............... H04N 1/2112 |

(Continued)

FOREIGN PATENT DOCUMENTS

| | | |
|---|---|---|
| CN | 111614887 A | 9/2020 |
| JP | 2010028492 A | 2/2010 |
| JP | 2020096255 A | 6/2020 |

(Continued)

*Primary Examiner* — Duy M Dang
(74) *Attorney, Agent, or Firm* — Dinsmore & Shohl LLP (57) ABSTRACT

Vehicle communication systems and methods for identifying and classifying objects as relevant to an occupant of a vehicle. A method includes capturing first object data at a first vehicle, classifying the first object data as relevant or non-relevant based on a first user profile associated with the first vehicle, and transmitting a transmission package including the first object data to a server in response to classifying the first object data as relevant.

19 Claims, 4 Drawing Sheets

(51) Int. Cl.
  *G06V 20/58*      (2022.01)
  *G07C 5/00*       (2006.01)

(56) References Cited

U.S. PATENT DOCUMENTS

2019/0236999 A1* 8/2019 Mertens ............... G06V 20/597
2020/0152039 A1  5/2020 Kasahara et al.

FOREIGN PATENT DOCUMENTS

KR      101846663 B1    5/2018
WO      2019022472 A1   1/2019

* cited by examiner

VEHICLE COMMUNICATION SYSTEMS AND METHODS FOR DETECTING AND CAPTURING RELEVANT OBJECT DATA

TECHNICAL FIELD

The present specification generally relates to systems and methods for identifying and classifying an object and, more specifically, systems and methods for identifying and classifying an object as being relevant to a particular occupant of a vehicle.

BACKGROUND

Conventional vehicles permit the use of cameras to capture images and other data surrounding a vehicle. However, these vehicles capture images of objects regardless of their relevance to a particular occupant of a vehicle. For example, objects relevant to one occupant of a vehicle may not be relevant to another occupant of the vehicle and, therefore, should not be captured in all instances. Thus, unnecessary images are captured by the cameras of the vehicle, thereby using additional resources of the vehicle. In addition, the data captured by the cameras of these vehicles may be transmitted to a server. However, when multiple vehicles capture similar images and other data, transmission of redundant data may use an excessive amount of storage space. In these instances, it may be desirable to discard similar or redundant instances of data captured by multiple vehicles to reduce the size of storage required at the server. Accordingly, these vehicles do not classify the captured images for purposes of determining whether the images should be retained or discarded from a transmission.

Accordingly, a need exists for improved vehicle communication systems that identify and capture data of objects that are determined to be relevant to a particular occupant of a vehicle.

SUMMARY

In one embodiment, a method includes capturing first object data at a first vehicle, classifying the first object data as relevant or non-relevant based on a first user profile associated with the first vehicle, and transmitting a transmission package including the first object data to a server in response to classifying the first object data as relevant.

In another embodiment, a vehicle includes a controller configured to capture object data, classify the object data as relevant or non-relevant based on a user profile associated with the vehicle, and transmit a transmission package including the object data to a server in response to classifying the object data as relevant.

In yet another embodiment, a communication system includes an infrastructure station including a first controller, the first controller configured to receive first object data from a first vehicle, receive second object data from a second vehicle, compare the first object data and the second object data to determine whether the first object data and the second object data include redundant object data, and in response to determining that the first object data and the second object data include redundant object data, discard the redundant object data from a transmission package.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to vehicle communication systems and methods for identifying and classifying an object as a relevant object.

The vehicle communication systems include a primary vehicle including one or more exterior sensors configured to obtain object data related to an object, and a controller. The controller is configured to classify the object data as relevant or non-relevant based on a user profile associated with the primary vehicle, and transmit the object data to a server in response to classifying the object data as relevant. The server may be a central server or an infrastructure station. In embodiments, the object data is transmitted within a transmission package to the infrastructure station, which compares the object data to object data received from other vehicles. By comparing the object data, redundant object data of the same object may be identified and particular instances of the redundant object data may be discarded to reduce the size of the transmission package before transmission to the central server.

Various embodiments of the systems and methods and the operation of the systems are described in more detail herein. Whenever possible, the same reference numerals will be used throughout the drawings to refer to the same or like parts.

Figure 1:
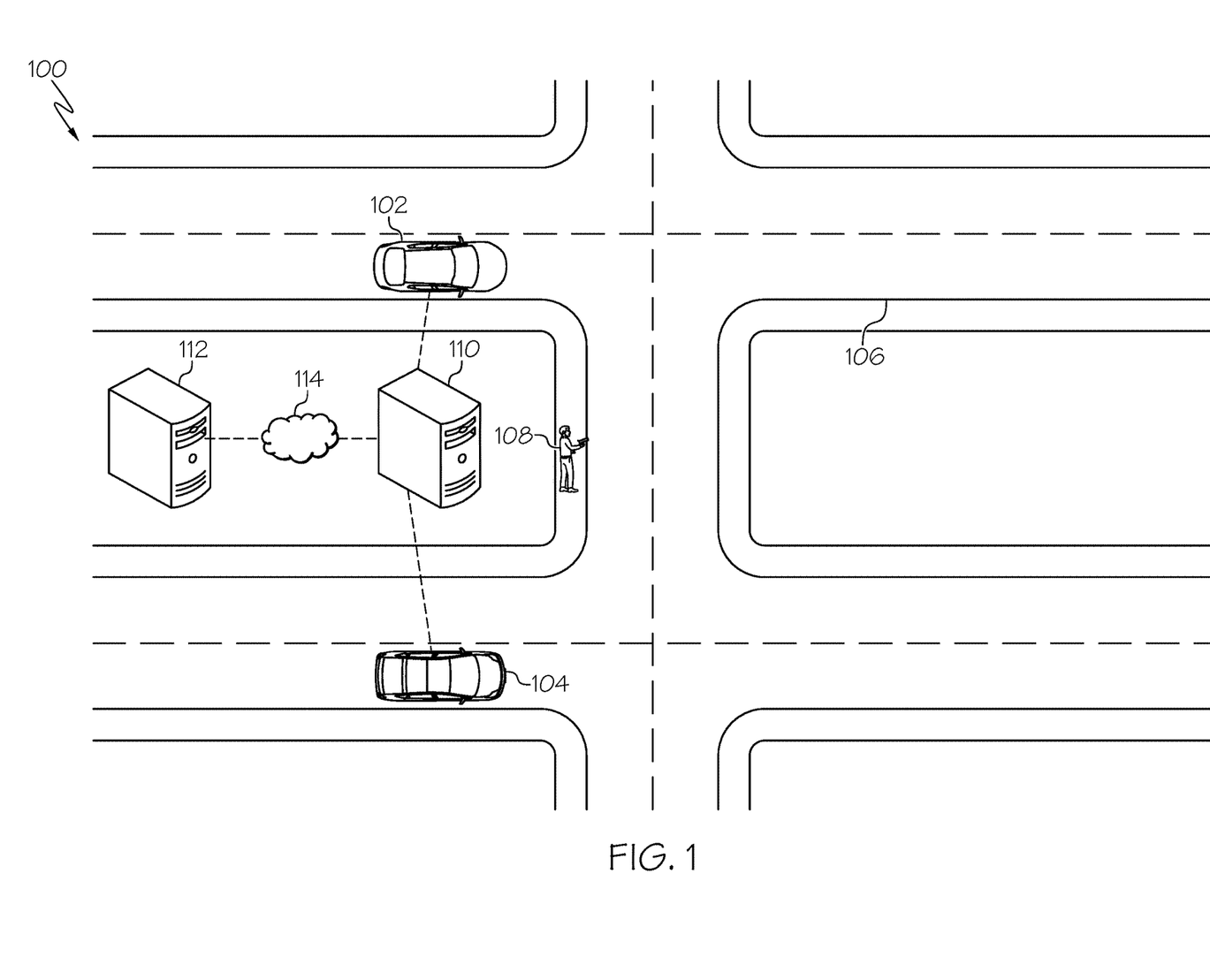
FIG. 1 schematically depicts a vehicle communication system including a primary vehicle, at least one secondary vehicle, an infrastructure station, and a central server, according to one or more embodiments shown and described herein.

Referring now to FIG. 1, a vehicle communication system 100 is shown generally including a primary vehicle 102. In embodiments, the vehicle communication system 100 may include any number of vehicles such as the primary vehicle 102 and one or more secondary vehicles 104. As shown the primary vehicle 102 and the secondary vehicle 104 are shown driving on a roadway 106. Each of the primary vehicle 102 and the secondary vehicle 104 may be a vehicle including an automobile or any other passenger or non-passenger vehicle such as, for example, a terrestrial, aquatic, and/or airborne vehicle. In some embodiment, one or more of the primary vehicle 102 and the secondary vehicle 104 may be an unmanned aerial vehicle (UAV), commonly known as a drone. While FIG. 1 illustrates only one secondary vehicle 104, it should be appreciated that the vehicle communication system 100 may include any number of secondary vehicles 104. As discussed in more detail herein, the primary vehicle 102 and the secondary vehicle 104 are capable of capturing object data of an object, such as the object 108, that is relevant to a particular vehicle occupant. As used herein, the term "relevant" is used to identify that the occupant would desire to capture object data, such as image data and/or audio data, of an object when the particular object is identified.

In embodiments, the primary vehicle 102 and the secondary vehicle 104 may communicate with an infrastructure station 110 of the vehicle communication system 100, which communicates with a central server 112 via a network 114 for transmitting object data captured by the primary vehicle 102 and the secondary vehicle 104 to the central server 112. The infrastructure station 110 may comprise one or more intermediate receiving devices that receive object data captured by and transmitted from the primary vehicle 102 and the secondary vehicle 104 for processing prior to transmitting the object data to the central server 112. Non-limiting examples of the infrastructure station 110 may include cellular stations, road side units, surveillance cameras, traffic lights, edge computing devices, and the like.

In embodiments, the primary vehicle 102 and the secondary vehicle 104 may communicate with the central server 112 via the network 114 directly, thereby bypassing the infrastructure station 110. The central server 112 may be a remote server such as a cloud server. In some embodiments, the central server 112 may be a local server including, but not limited to, an edge server and the like. The central server 112 may communicate with vehicles in an area covered by the central server 112. The central server 112 may communicate with other servers that cover different areas. The central server 112 may communicate with a remote server and transmit information collected by the central server 112 to the remote server.

In embodiments, each of the primary vehicle 102 and the secondary vehicle 104 may include a neural network for identifying objects and classifying the objects as being either relevant or non-relevant. Additionally, the neural network may include a machine learning algorithm for identifying objects and classifying the objects as relevant or non-relevant. As discussed in more detail herein, the neural network of the primary vehicle 102 and the secondary vehicle 104 may be updated automatically and/or by user operation to more accurately identify and classify objects in accordance with specific user preferences.

As shown in FIG. 1, the object 108 is illustrated as a person, but it should be appreciated that the object 108 may be any suitable object such as, for example, a gas station, a high-traffic-pedestrian area, an available parking spot, a traffic accident, a particular animal, and the like. As described in more detail herein, the primary vehicle 102 and the secondary vehicle 104 are each capable of detecting the object 108 and classifying the object 108 as being either relevant or non-relevant using the neural network and in accordance with a user profile. As shown and described in more detail herein, the object 108 is a person holding a weapon and classified as being relevant to an occupant of the primary vehicle 102 and an occupant of the secondary vehicle 104.

Figure 2:
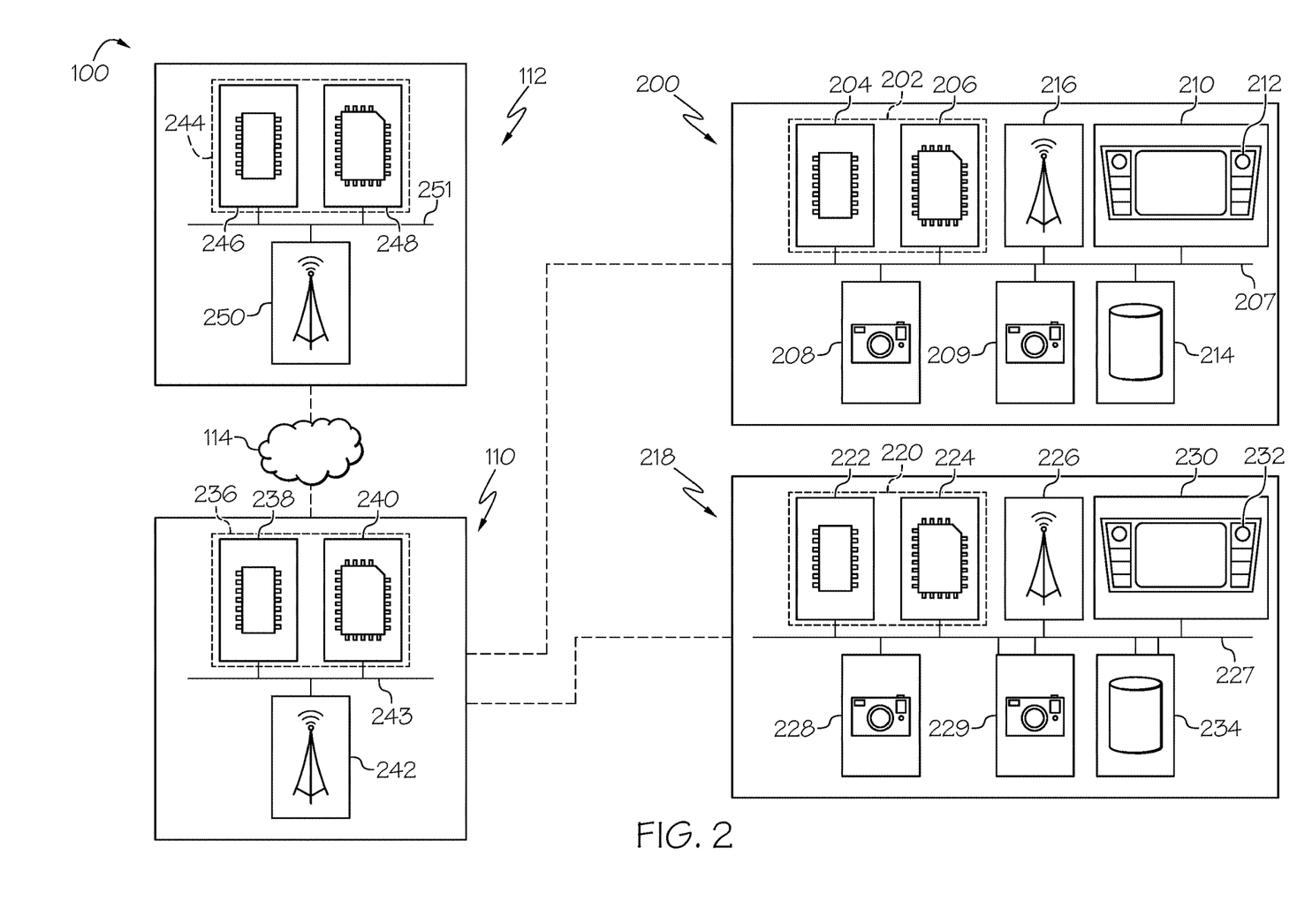
FIG. 2 schematically depicts components of the vehicle communication system, according to one or more embodiments shown and described herein.

FIG. 2 depicts a schematic diagram of the vehicle communication system 100 including a primary vehicle system 200, a secondary vehicle system 218, the infrastructure station 110, the central server 112, and the network 114, according to one or more embodiments shown and described herein. It is noted that, while the primary vehicle system 200 and the secondary vehicle system 218 are depicted in isolation, each of the primary vehicle system 200 and the secondary vehicle system 218 may be included within a vehicle, for example, within the primary vehicle 102 and the secondary vehicle 104 of FIG. 1, respectively. Further, it should be appreciated that while only one secondary vehicle system 218 of the secondary vehicle 104 is illustrated, the vehicle communication system 100 may include any number of secondary vehicle systems 218 based on the number of secondary vehicles 104 present.

The primary vehicle system 200 includes a controller 202 including one or more processors 204 and one or more memory modules 206. Each of the one or more processors 204 may be any device capable of executing machine readable and executable instructions. Accordingly, each of the one or more processors 204 may be an integrated circuit, a microchip, a computer, or any other computing device. The one or more processors 204 are coupled to a communication path 207 that provides signal interconnectivity between various modules of the primary vehicle system 200. Accordingly, the communication path 207 may communicatively couple any number of processors 204 with one another, and allow the modules coupled to the communication path 207 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 207 may be formed from any medium that is capable of transmitting a signal such as, for example, conductive wires, conductive traces, optical waveguides, or the like. In some embodiments, the communication path 207 may facilitate the transmission of wireless signals, such as WiFi, Bluetooth®, Near Field Communication (NFC) and the like. Moreover, the communication path 207 may be formed from a combination of mediums capable of transmitting signals. In one embodiment, the communication path 207 comprises a combination of conductive traces, conductive wires, connectors, and buses that cooperate to permit the transmission of electrical data signals to components such as processors, memories, sensors, input devices, output devices, and communication devices. Accordingly, the communication path 207 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

As noted above, the primary vehicle system 200 includes one or more memory modules 206 coupled to the communication path 207. The one or more memory modules 206 may comprise RAM, ROM, flash memories, hard drives, or any device capable of storing machine readable and executable instructions such that the machine readable and executable instructions can be accessed by the one or more processors 204. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory modules 206 may include one or more neural networks. The one or more memory modules 206 may include machine readable instructions that, when executed by the one or more processors 204, cause the primary vehicle system 200 to receive object data from one or more sensors of an object, such as the object 108 of FIG. 1, and process the object data with the neural network to classify the object 108 as either relevant or non-relevant.

Referring still to FIG. 2, the primary vehicle system 200 comprises one or more exterior sensors 208. The one or more exterior sensors 208 may be any device having an array of sensing devices capable of detecting radiation in an ultraviolet wavelength band, a visible light wavelength band, or an infrared wavelength band. The one or more exterior sensors 208 may have any resolution. In some embodiments, one or more optical components, such as a mirror, fish-eye lens, or any other type of lens may be optically coupled to the one or more exterior sensors 208. In embodiments described herein, the one or more exterior sensors 208 may provide image data to the one or more processors 204 or another component communicatively coupled to the communication path 207. The image data may include image data of the object 108 in FIG. 1. In some embodiments, the one or more exterior sensors 208 may also be configured to capture sound data and provide the sound data to the one or more processors 204 or another component communicatively coupled to the communication path 207.

In some embodiments, the one or more exterior sensors 208 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors and that such data could be integrated into or supplement the data collection described herein.

In operation, the one or more exterior sensors 208 capture object data and communicate the object data to the one or more processors 204 and/or to other systems communicatively coupled to the communication path 207. The object data may be received by the one or more processors 204, which may process the object data using one or more processing algorithms. Any known or yet-to-be developed video, image, and audio processing algorithms may be applied to the object data in order to identify the object 108. Example video and image processing algorithms include, but are not limited to, kernel-based tracking (such as, for example, mean-shift tracking) and contour processing algorithms. One or more object recognition algorithms may be applied to the image data to extract objects. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms. In some embodiments, the processing of the image data may be performed at the primary vehicle system 200, and the primary vehicle system 200 may selectively transmit the captured object data to the infrastructure station 110 and/or the central server 112 based on analysis of the processed image data.

The primary vehicle system 200 may include the one or more interior sensors 209 provided within an interior of the primary vehicle 102. It should be appreciated that the one or more interior sensors 209 may include the same components and capabilities as the exterior sensors 208. However, the one or more interior sensors 209 are provided within an interior of the primary vehicle 102 and directed within an occupant compartment of the primary vehicle 102 to detect a direction of a gaze of an occupant of the primary vehicle 102. Accordingly, the interior sensors 209 are configured to capture data of a gaze of one or more occupants of the primary vehicle 102. The data is then communicated to the one or more processors 204 to determine a direction of the gaze of the one or more occupants. As described in more detail herein, the gaze of the occupant may be utilized to determine which objects are relevant to the occupant and adjust a user profile associated with the occupant accordingly.

The primary vehicle system 200 may include a display device 210 for providing visual output such as, for example, notifications, entertainment, maps, navigation, information, or a combination thereof. The display device 210 is coupled to the communication path 207 and communicatively coupled to the one or more processors 204. Accordingly, the communication path 207 communicatively couples the display device 210 to other modules of the primary vehicle system 200. The display device 210 may include any medium capable of transmitting an optical output such as, for example, a cathode ray tube, light emitting diodes, a liquid crystal display, a plasma display, projection display, holographic display, augmented display, and the like. Moreover, the display device 210 may be a touchscreen that, in addition to providing optical information, detects the presence and location of a tactile input upon a surface of or adjacent to the display. Accordingly, the display device 210 may receive mechanical input directly upon the optical output provided by the display device 210.

The primary vehicle system 200 may include a tactile operating device 212 coupled to the communication path 207 such that the communication path 207 communicatively couples the tactile operating device 212 to other modules of the primary vehicle system 200. The tactile operating device 212 may be any device capable of transforming mechanical, optical, or electrical signals into a data signal capable of being transmitted with the communication path 207. Specifically, the tactile operating device 212 may include any number of movable objects that each transform physical motion into a data signal that may be transmitted to over the communication path 207 such as, for example, a button, a switch, a knob, a microphone, and the like. In some embodiments, the display device 210 and the tactile operating device 212 are combined as a single module and operate as an audio head unit or an infotainment system.

The primary vehicle system 200 may include a data storage component 214. The data storage component 214 may store data that may be utilized by the one or more processors 204, memory modules 206, and/or other components of the primary vehicle system 200. For example, the data storage component 214 may store user profiles associated with one or more users. A user profile associated with a user, i.e., a vehicle occupant, may include a list of objects determined to be relevant to that user and for which object data of the object should be captured.

The primary vehicle system 200 comprises network interface hardware 216 for communicatively coupling the primary vehicle system 200 to the infrastructure station 110 and/or the central server 112. The network interface hardware 216 can be communicatively coupled to the communication path 207 and can be any device capable of transmitting and/or receiving data via the network 114. Accordingly, the network interface hardware 216 can include a communication transceiver for sending and/or receiving any wired or wireless communication. For example, the network interface hardware 216 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol.

Still referring to FIG. 2, in embodiments, the secondary vehicle system 218 includes a controller 220 including one or more processors 222 and one or more memory modules 224, network interface hardware 226, and a communication path 227 communicatively connected to the other components of the secondary vehicle system 118. In embodiments, the secondary vehicle system 218 also includes one or more exterior sensors 228, one or more interior sensors 229, a display device 230, a tactile operating device 232, and a data storage component 234. The components of the secondary vehicle system 218 may be structurally similar to and have similar functions as the corresponding components of the primary vehicle system 200 (e.g., the one or more processors 222 corresponds to the one or more processors 204, the one or more memory modules 224 corresponds to the one or more memory modules 206, the one or more exterior sensors 228 corresponds to the one or more sensors 208, the one or more interior sensors 229 corresponds to the one or more interior sensors 209, the display device 230 corresponds to the display device 210, the tactile operating device 232 corresponds to the tactile operating device 212, the data storage component 234 corresponds to the data storage component 214, the network interface hardware 226 corresponds to the network interface hardware 216, and the communication path 227 corresponds to the communication path 207).

Still referring to FIG. 2, the infrastructure station 110 includes a controller 236 including one or more processors 238 and one or more memory modules 240, network interface hardware 242, and a communication path 243. The one or more processors 238 may be an integrated circuit, a microchip, a computer, or any other computing device. The one or more memory modules 240 may comprise RAM, ROM, flash memories, hard drives, or any device capable of storing machine readable and executable instructions such that the machine readable and executable instructions can be accessed by the one or more processors 238. The communication path 243 may be similar to the communication path 207 in some embodiments.

Still referring to FIG. 2, the central server 112 includes a controller 244 including one or more processors 246 and one or more memory modules 248, network interface hardware 250, and a communication path 251. The one or more processors 246 may be an integrated circuit, a microchip, a computer, or any other computing device. The one or more memory modules 248 may comprise RAM, ROM, flash memories, hard drives, or any device capable of storing machine readable and executable instructions such that the machine readable and executable instructions can be accessed by the one or more processors 246. The communication path 251 may be similar to the communication path 207 in some embodiments.

Figure 3:
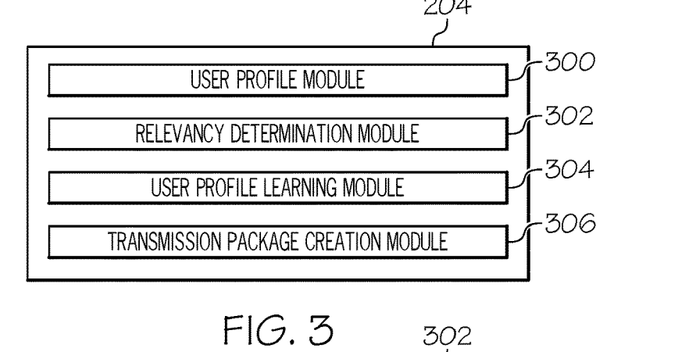
FIG. 3 schematically depicts an embodiment of a processor of a primary vehicle system, according to one or more embodiments shown and described herein.

Referring now to FIG. 3, an embodiment of the one or more processors 204 of the primary vehicle system 200 is shown including a user profile module 300, a relevancy determination module 302, a user profile learning module 304, and a transmission package creation module 306. As noted above, the one or more processors 222 of the secondary vehicle system 218 may include the same components and modules discussed herein.

The user profile module 300, discussed in more detail herein, identifies a user profile associated with an occupant to be loaded onto the primary vehicle 102 for determining which objects should be classified as relevant. Thus, different objects are classified as relevant based on which user profile is loaded onto the primary vehicle 102.

After a particular user profile associated with an occupant of the primary vehicle 102 is loaded, the relevancy determination module 302 identifies objects captured by the one or more exterior sensors 208 and determine if the object appears on the list of relevant objects included on the loaded user profile which are relevant to the occupant. The relevancy determination module 302 includes a neural network for identifying objects and classifying those objects as being either relevant or non-relevant. The neural network may include a machine learning algorithm for identifying objects and determining whether the object appears on the list of objects of the loaded user profile.

The user profile learning module 304 modifies the loaded user profile to adjust or update which objects are to be classified as relevant. In some embodiments, the user profile learning module 304 utilizes the one or more interior sensors 209 to determine a gaze of the occupant associated with the loaded user profile and identify relevant environment and/or objects based on detected patterns in the occupant's gaze. More particularly, the user profile learning module 304 may identify that the gaze of the occupant is focused on a specific object or category of objects such as, for example, gas stations, high-traffic-pedestrian areas, available parking spots, traffic accidents, and the like. The specific object the occupant is looking at may be determined by processing object data captured by the one or more exterior sensors 208 in the same or a similar direction of the occupant's gaze. Thus, the user profile learning module 304 may adjust the user profile associated with that occupant in response to determining that the occupant's gaze is focused on a specific object. The adjusting of the user profile may include adding a specific object or category of objects to the list of relevant objects included in the user profile so that those objects are determined to be relevant when detected.

After identifying an object that is determined to be relevant and capturing object data of the object, the transmission package creation module 306 creates a transmission package including the captured object data. The transmission package is a package of data to be transmitted from the primary vehicle 102 to the central server 112 or the infrastructure station 110. It should be appreciated that data captured by the one or more exterior sensors 208 includes object data that is determined to be non-relevant, is not included in the transmission package. Thus, it should be appreciated that the size of the transmission package may be reduced by discarding object data associated with objects that are not determined to be relevant to an occupant of the primary vehicle 102. In addition to object data pertaining to relevant objects, the transmission package may include additional information pertaining to the primary vehicle 102 such as, for example, vehicle location information, vehicle usage information, identification information about the vehicle, identification information about one or more occupants in the vehicle, and the like.

Figure 4:
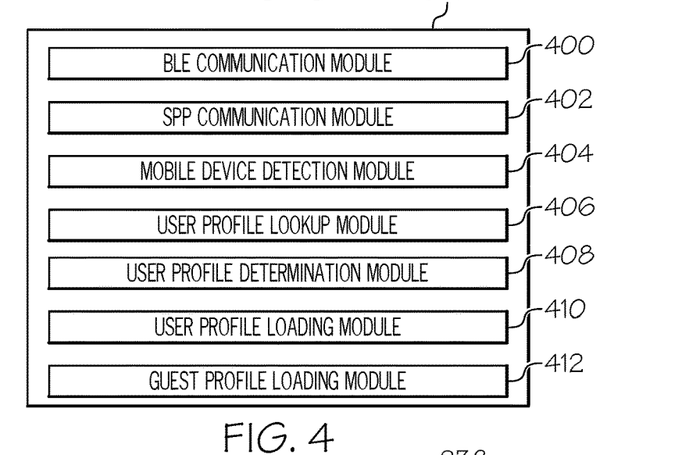
FIG. 4 schematically depicts a user profile module of the primary vehicle system, according to one or more embodiments shown and described herein.

Now referring to FIG. 4, an embodiment of the user profile module 300 is illustrated. In embodiments, the user profile module 300 includes a BLE communication module 400, an SPP communication module 402, a mobile device detection module 404, a user profile lookup module 406, a user profile determination module 408, a user profile loading module 410, and a guest profile loading module 412. Each of the BLE communication module 400, the SPP communication module 402, the mobile device detection module 404, the user profile lookup module 406, the user profile determination module 408, the user profile loading module 410, and the guest profile loading module 412 may be a program module in the form of operating systems, application program modules, and other program modules stored in the one or more processors 204 or the one or more memory modules 206. Such a program module may include, but is not limited to, routines, subroutines, programs, objects, components, data structures and the like for performing specific tasks or executing specific data types as will be described below.

The BLE communication module 400 may establish BLE communication with one or more mobile devices using the BLE protocol. Specifically, the BLE communication module 400 may cause the network interface hardware 216 to broadcast a BLE signal that may be detected by mobile devices located inside or near the primary vehicle 102. When a mobile device receives the BLE broadcast signal, a communication channel may be established between the BLE communication module 400 and the mobile device by pairing the mobile device to the BLE communication module 400 using the BLE protocol.

In embodiments, a mobile device may run an appropriate application (e.g., an application compatible with the primary vehicle system 200) so that the mobile device may be paired with the BLE communication module 400. By using the BLE protocol, the BLE communication module 400 may pair with a mobile device even if the mobile device has not previously been paired with the primary vehicle system 200. Once a mobile device is paired to the BLE communication module 400, data may be transmitted between the BLE communication module 400 and the mobile device via the network interface hardware 216.

The SPP communication module 402 may establish SPP communication with a mobile device using the SPP protocol. However, unlike the BLE protocol, the SPP protocol can only be used to pair with a mobile device that has been previously paired with the primary vehicle system 200. Accordingly, the SPP communication module 402 may cause the network interface hardware 216 to ping for mobile devices that have previously been paired to the SPP communication module 402. When a mobile device responds to a ping from the SPP communication module 402, a communication channel may be established between the SPP communication module 402 and the mobile device by pairing the mobile device to the SPP communication module 402 using the SPP protocol. Once a mobile device is paired to the SPP communication module 402, data may be transmitted between the SPP communication module 402 and the mobile device via the network interface hardware 216.

The mobile device detection module 404 may detect one or more mobile devices positioned within or in the vicinity of the primary vehicle 102. Specifically, after a mobile device is paired to either the BLE communication module 400 or the SPP communication module 402, the mobile device detection module 404 may determine a device ID associated with the paired mobile device. In embodiments, each mobile device that is able to pair with the BLE communication module 400 and/or the SPP communication module 402 (e.g., each mobile device running an application associated with the primary vehicle system 200) has a device ID that uniquely identifies the mobile device. Accordingly, the device ID of a paired mobile device may be detected by the mobile device detection module 404 to identify the paired mobile device. Furthermore, each device ID may be associated with a particular user profile associated with an owner or user of the mobile device having the device ID. As such, a device ID of a mobile device may be used to determine a user profile associated with a particular user.

In embodiments, one or more user profiles associated with one or more device IDs may be stored in the data storage component 214. As discussed above, each user profile may include a list of objects that are deemed to be relevant to that particular occupant such as a gas station, a high-traffic-pedestrian area, an available parking spot, a traffic accident, a particular animal, and the like, and associated identifying data for each of the objects. The settings of the user profile may be stored in the data storage component 214. In some examples, a user may select a user profile by operating the tactile operating device 212. In some examples, a user may establish a user profile using a mobile device. In other examples, a user may establish a user profile using other methods and/or devices. In some embodiments, one or more user profiles may be stored in the central server 112, and the primary vehicle system 200 may receive the one or more user profiles from the central server 112 when corresponding user profiles are needed to be loaded on the primary vehicle system 200.

Referring still to FIG. 4, the user profile lookup module 406 may look up a user profile associated with a particular device ID associated with a mobile device. That is, after a mobile device is paired to either the BLE communication module 400 or the SPP communication module 402 and the mobile device detection module 404 determines the device ID of the paired mobile device, the user profile lookup module 406 may access the data storage component 214 and determine whether a user profile exists that is associated with the determined device ID. If a user profile has been established for the user associated with a detected device ID, then that user profile will be stored in the data storage component 214 and the user profile lookup module 406 may access that user profile. Alternatively, if no user profile exists for the detected device ID, then no user profile associated with the detected device ID will be stored in the data storage component 214 and the user profile determination module 408 will be unable to access a user profile associated with the detected device ID. If multiple mobile devices are detected by the mobile device detection module 404, the user profile lookup module 406 may determine whether a user profile associated with each such mobile device exists and may access each existing user profile.

Referring still to FIG. 4, the user profile determination module 408 determines which user profile to load. In embodiments in which a user profile is selected by operating the tactile operating device 212, the user profile is loaded. In addition, if a single mobile device is detected by the mobile device detection module 404, and the user profile lookup module 406 is able to access a user profile associated with the device ID of the detected mobile device, then the user profile determination module 408 may determine that the user profile associated with the detected mobile device should also be loaded.

Alternatively, if no user profile is selected using the tactile operating device 212 and a single mobile device is detected by the mobile device detection module 404, but the user profile lookup module 406 is unable to find a user profile associated with the device ID of the detected mobile device, then the user profile determination module 408 may determine that a guest profile should be loaded. A guest profile may include a default list of objects determined to be relevant for which an occupant of the vehicle should be made aware. A guest profile may be stored in the data storage component 214. Accordingly, the user profile determination module 408 may determine that a guest user profile is to be loaded.

In examples where the mobile device detection module 404 detects multiple mobile devices and/or a user profile is also selected using the tactile operating device 212, multiple user profiles may be loaded. As such, the user profile determination module 408 may determine which user profile to load using the techniques described herein.

Referring still to FIG. 4, the user profile loading module 410 may load the user profile(s) selected by the user profile determination module 408 stored in the data storage component 214. This may provide a master list identifying all relevant objects of which an occupant of the primary vehicle 102 should be made aware.

The guest profile loading module 412 may load the guest profile stored in the data storage component 214 when the user profile determination module 408 determines that the guest profile should be loaded. This may cause the primary vehicle system 200 to identify only those relevant objects associated with the guest user profile. In some examples, a user may adjust the list of relevant objects associated with the guest profile.

Figure 5:
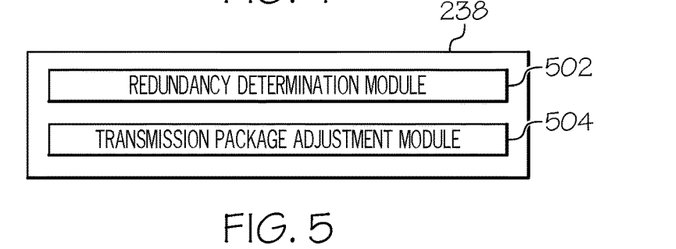
FIG. 5 schematically depicts a processor of an infrastructure station, according to one or more embodiments shown and described herein.

Referring now to FIG. 5, an embodiment of the one or more processors 238 of the infrastructure station 110 is shown. In embodiments, the processor 238 includes a redundancy determination module 502 and a transmission package adjustment module 504.

In embodiments in which the infrastructure station 110 is present and an instruction is received to transmit the transmission package from the primary vehicle 102 to the infrastructure station 110, rather than the central server 112, the infrastructure station 110 may receive transmission packages from more additional sources, such as one or more secondary vehicles 104. The infrastructure station 110 may be utilized to identify redundant information, i.e., object data of the same object, to reduce the size of transmission packages transmitted to the central server 112. As a result, the central server 112 is required to store less data received from the primary vehicle 102 and the secondary vehicle(s) 104. The redundancy determination module 502 compares transmission packages, specifically object data within each of the transmission packages, received from the primary vehicle 102 and the secondary vehicle 104. In doing so, the redundancy determination module 502 may identify object data captured of the same object and determine that only one instance of the object data is necessary to be transmitted to the central server 112. To more efficiently identify redundant object data, the redundancy determination module 502 may compare location information associated with the object data of each object to determine that the object is in fact the same object.

Once redundant object data is identified as being included in multiple transmission packages, the transmission package adjustment module 504 determines which instance of the redundant object data should be retained and which instance should be discarded. Certain factors for determining which instance of the redundant object data should be retained may include, for example, proximity of the vehicle to the object, quality of the object data (e.g., resolution, etc.), and the like. Based on one or more of these factors, the transmission package adjustment module 504 modifies the individual transmission packages from each vehicle to discard certain instances of the redundant object data. Thus, in embodiments, all but one instance of the redundant object data may be retained in one of the transmission packages. Although, in some embodiments, more than one instance may be retained. Once the transmission packages are modified to remove the instances of redundant object data, the modified transmission packages are transmitted from the infrastructure station 110 to the central server 112.

Figure 6:
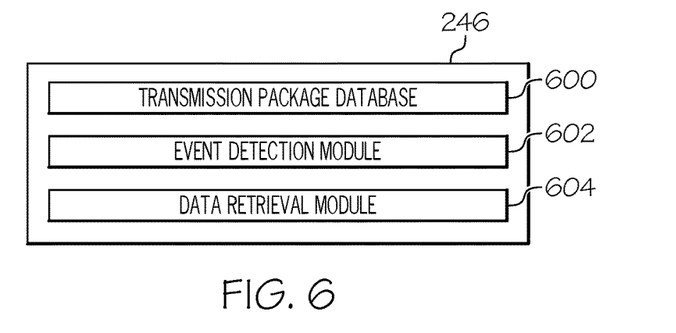
FIG. 6 schematically depicts a processor of the central server, according to one or more embodiments shown and described herein.

Referring now to FIG. 6, an embodiment of the one or more processors 246 of the central server 112 is shown. In embodiments, the processor 246 includes a transmission package database 600, an event detection module 602, and a data retrieval module 604.

When the transmission packages are transmitted to the central server 112 from the infrastructure station 110, or directly from the primary vehicle 102 and the secondary vehicle 104, the transmission packages are stored within the transmission package database 600. Within the transmission package database 600, the object data may be cataloged and organized in any suitable manner such as, for example, by day/time, location, type of object, capturing vehicle, and the like. It should be appreciated that the cataloging of the object data is useful so that particular instances of object data may be retrieved, such as by a user, in an efficient manner.

The event detection module 602 processes the object data to determine various events. As a non-limiting example, the event detection module 602 may determine, based on each instance of object data associated with a particular location, that a rideshare demand is increasing based on a large population of people detected by the primary vehicle 102 and the secondary vehicle 104 at or near the particular location. Other non-limiting examples of events occurring may include an accident occurring based on a large backup of traffic, a crime occurring, and the like. The detection of an event occurring may trigger a notification to a relevant party such as, for example, ridesharing drivers, emergency personnel, and the like.

The data retrieval module 604 facilitates retrieving particular object data stored within the transmission package database 600 in response to a requesting an instruction and/or a transmitting from a user or some other party. In embodiments, a user, such as an occupant of the primary vehicle 102, may request to view previously captured object data obtained on a particular day, at a particular time, and/or at a particular location. The user, such as an occupant of the primary vehicle 102, may access at least a portion of the transmission package database 600 to view object data captured by the primary vehicle 102. Thus, in embodiments, the user is limited to viewing only object data captured by the primary vehicle 102. Accordingly, it should be appreciated that the cataloging of the object data makes it easier for the user to quickly identify object data for which the user may be interested. The transmission package database 600 may be accessed using any suitable device such as, for example, the tactile operating device 212 or a mobile device. Alternatively, the user may submit a request to the central server 112 requesting object data pertaining to a particular instance. In response, the central server 112 may transmit the requested object data to the user to be viewed on any suitable device such as, for example, the display device 210 and/or the user's mobile device. The cataloging may also reduce the time required for the central server 112 to parse through the entire database of object data to identify the requested object data.

Figure 7:
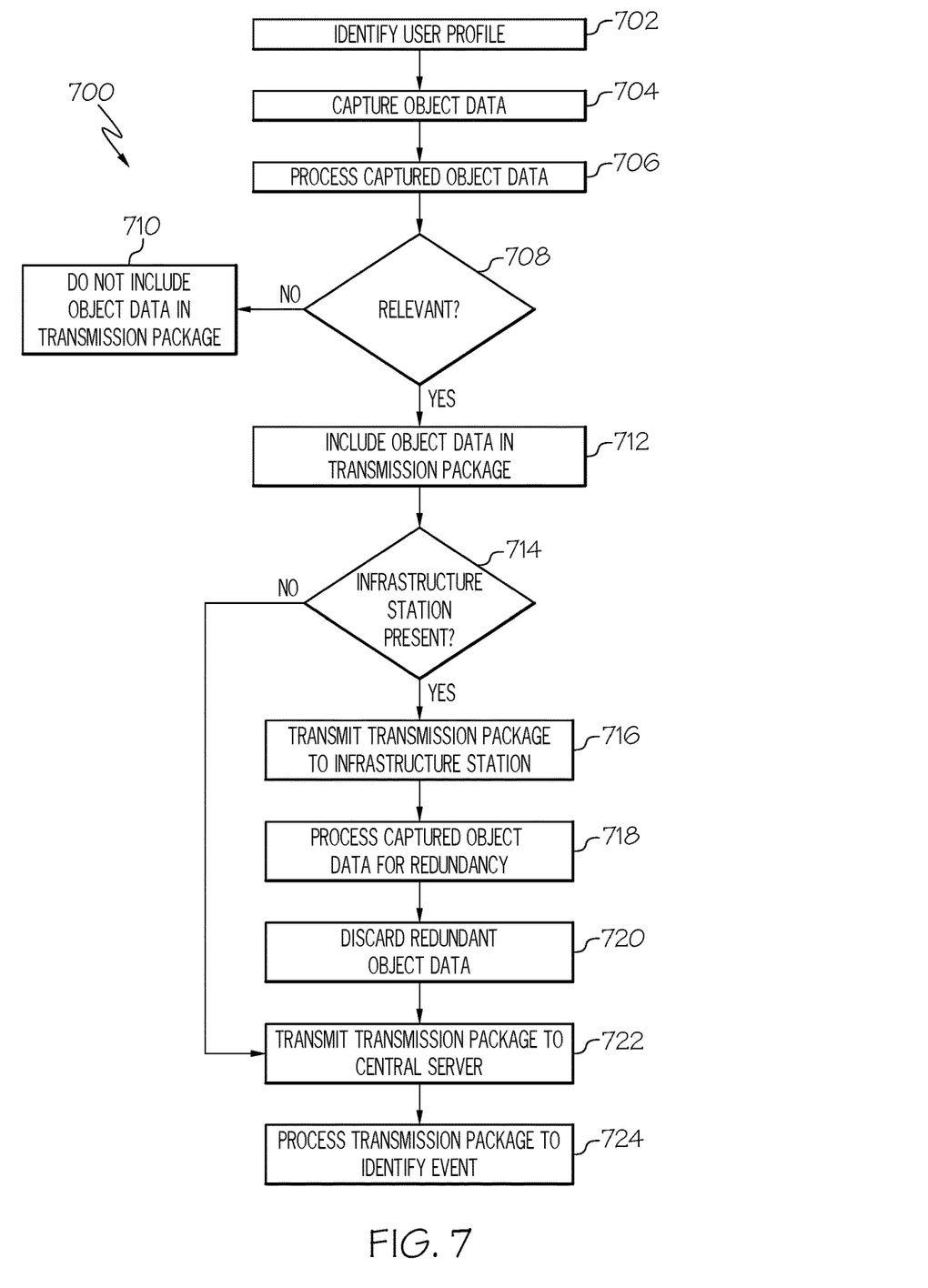
FIG. 7 schematically depicts a flowchart of a method for identifying and classified an object as a relevant object, according to one or more embodiments shown and described herein.

FIG. 7 depicts a method 700 for capturing object data of an object classified as being relevant to an occupant of a vehicle, according to one or more embodiments shown and described herein. The method 700 is described herein with reference to FIGS. 1-6 and object data captured by the primary vehicle 102. However, it should be appreciated that the method 700 described herein is equally applicable to object data being captured by the secondary vehicle 104 by the one or more exterior sensors 228.

Initially, at step 702, a user profile is identified. As discussed herein, the user profile may be identified upon an occupant of the primary vehicle 102 operating the tactile operating device 212. Alternatively, the user profile may be identified by detecting the presence of a mobile device and associating the mobile device with a user profile by utilizing the mobile device detection module 404, the user profile lookup module 406, the user profile determination module 408, and the user profile loading module 410. The user profile includes a list of objects determined to be relevant to the particular occupant. The information associated with the user profile may be updated by operating the tactile operating device 212, a mobile device, or any other suitable manner discussed herein. It should be appreciated that in embodiments in which more than one occupant is within the primary vehicle 102, a plurality of user profiles may be simultaneously loaded. By loading multiple user profiles, the total number of potential relevant objects that may be identified may increase as opposed to when only a single user profile is loaded.

At step 704, the one or more exterior sensors 208 of the primary vehicle 102 capture environment data within a predetermined vicinity or range of the primary vehicle 102. It should be appreciated that, by capturing environment data, object data of various objects surrounding the primary vehicle 102 is also captured. In embodiments, the one or more exterior sensors 208 are continuously capturing environment data and object data. In other embodiments, the one or more exterior sensors 208 are activated to capture environment data and object data upon a triggering event such as, for example, identifying a triggering sound, a visual cue, or the primary vehicle 102 entering a particular geographic region or location. As a non-limiting example, the triggering sound may be a vehicle horn, tires screeching, a person yelling above a threshold level, and the like.

At step 706, the processor 204 of the primary vehicle 102, specifically the relevancy determination module 302, identifies individual objects within the environment data and associated object data in any suitable manner described herein such as by using a neural network and/or machine learning. The object, e.g., the object 108, is classified as being relevant or non-relevant to an occupant of the primary vehicle 102 based on the user profile selected. In the embodiment illustrated in FIG. 1, the object 108 is a person holding a weapon. Thus, the relevancy determination module 302 determines whether the list of relevant objects included in the user profile identifies that a person holding a weapon should be classified as a relevant object. In embodiments, the user profile provides a list of only those objects that should be classified as relevant. Accordingly, all other identified objects are classified as non-relevant.

At step 708, a determination is made as to whether the object 108 was classified as relevant or non-relevant to the occupant of the primary vehicle 102 by the relevancy determination module 302. If the determination is made at step 708 that the object 108 was classified as non-relevant, the method 700 proceeds to step 710 at which object data pertaining to the object 108 is not included in a transmission package to be transmitted from the primary vehicle 102 to the infrastructure station 110 or the central server 112. Alternatively, if the determination is made at step 708 that the object 108 was classified as relevant, the method 700 proceeds to step 712 at which object data pertaining to the object 108 is included in a transmission package to be transmitted from the primary vehicle 102 to the infrastructure station 110 or the central server 112.

As discussed herein, in embodiments, the transmission package created at the primary vehicle 102 is transmitted to the infrastructure station 110 prior to being transmitted to the central server 112 if the infrastructure station 110 is present and an instruction is received to transmit the transmission package to the infrastructure station 110. The instruction may be sent from the infrastructure station 110, the central server 112, or the primary vehicle 102 itself. The infrastructure station 110 operates as an intermediate transmission point for processing various transmission packages, such as those received from the primary vehicle 102 and the one or more secondary vehicles 104, to eliminate redundant object data across multiple transmission packages.

At step 714, a determination is made as to whether the infrastructure station 110 is present and an instruction is received to transmit the transmission package from the primary vehicle 102 to the infrastructure station 110 prior to the central server 112. If a determination is made at step 714 that the infrastructure station 110 is present and an instruction is received instructing the primary vehicle 102 to transmit the transmission package to the infrastructure station 110, the method 700 proceeds to step 716 at which the transmission package is transmitted from the primary vehicle 102 to the infrastructure station 110.

At step 718, the object data included in the transmission package from the primary vehicle 102 is processed by the infrastructure station 110, specifically the redundancy determination module 502, to determine if a transmission package from the primary vehicle 102 includes redundant object data as that included in a transmission package received from one or more secondary vehicles 104. More particularly, the redundancy determination module 502 compares the transmission package received from the primary vehicle 102 to the transmission package received from the secondary vehicle 104 to identify similar instances of object data. Similar instances of object data across multiple transmission packages may be determined using any suitable comparison means such as image comparison, audio comparison, and the like. In embodiments, when a threshold similarity is established between various instances of object data, it is determined that the various instances of object data are redundant. The transmission packages may be received at different times and, thus, the transmission packages may be temporarily stored at the infrastructure station 110 before being transmitted to the central server 112. As additional transmission packages are received at the infrastructure station 110, they are compared to the stored transmission packages. After a predetermined period of time, the stored transmission packages are transmitted to the central server 112 and no longer compared to other incoming transmission packages to identify redundant object data.

If redundant object data is identified within the transmission package of the primary vehicle 102 and the transmission package of one or more secondary vehicles 104, the redundant object data included in one of the transmission packages is discarded at step 720. In embodiments in which a plurality of transmission packages received from a plurality of vehicles, such as the primary vehicle 102 and a plurality of secondary vehicles 104, are determined to include redundant object data, all instances of redundant object data except for one are discarded from the plurality of transmission packages. Once redundant object data is discarded from a transmission package, any remaining data in the transmission package is used to create a modified transmission package. Specifically, the transmission package adjustment module 504 of the infrastructure station 110 creates the modified transmission package.

At step 722, the modified transmission package is transmitted from the infrastructure station 110 to the central server 112. Thus, it should be appreciated that by removing redundant object data from an original transmission package, the size of the modified transmission package is less than the size of the original transmission package. Once the modified transmission package is received at the central server 112, the modified transmission package is stored in the transmission package database 600, thereby using less storage space than would otherwise be used if redundant object data were to be included in the transmission packages received at the central server 112. In embodiments, as discussed herein, the individual object data included in the modified transmission package is cataloged in the central server 112 so that the object data may be more efficiently retrieved at a later time.

At step 724, the central server 112 processes the modified transmission packages to identify an event, as described in more detail herein. Specifically, the event detection module 602 processes the object data included in each of the modified transmission packages to identify an event. As a non-limiting example, the event detection module 602 may identify, based on object data received from a plurality of modified transmission packages, a large gathering of people in a particular location, which may be indicative of a high demand for ridesharing. This determination of an event may be suitable for transmission to one or more ridesharing services or particular vehicles.

Alternatively, if a determination is made at step 714 that no infrastructure station is present or no instruction is received to transmit the transmission package to an infrastructure station, the transmission package is transmitted to the central server 112 directly. Thus, the method 700 proceeds directly to step 722 to transmit the transmission package to the central server 112. It should be appreciated that when the transmission package bypasses the infrastructure station 110, transmission packages received from the primary vehicle 102 and one or more secondary vehicles 104 may still be processed to identify and discard redundant object data from storage in the transmission package database 600 of the central server 112. Here, the central server 112 itself processes the transmission packages to identify redundant object data rather than the infrastructure station 110.

From the above, it is to be appreciated that defined herein are systems and methods for identifying and classifying an object as being relevant. More particularly, systems and methods are disclosed herein in which one or more exterior sensors capture object data of an object and the captured object data is classified as being relevant in accordance with a user profile. The specific user profile is selected from a plurality of user profiles loaded onto the vehicle based on a particular occupant present in the vehicle. Accordingly, the captured object data is based on the particular occupant present in the vehicle such that different object data is captured and classified when different occupants are present.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
capturing first object data at a first vehicle;
transmitting the first object data to a server;
capturing second object data at a second vehicle;
transmitting the second object data to the server;
comparing the first object data and the second object data at the server to determine whether the first object data and the second object data include redundant object data; and
in response to determining that the first object data and the second object data include redundant object data, discarding the redundant object data from a transmission package.

2. The method of claim 1, further comprising:
classifying the first object data as relevant or non-relevant based on a first user profile associated with an occupant of the first vehicle,
wherein the first object data is transmitted to the server in response to classifying the first object data as relevant.

3. The method of claim 1, wherein the transmission package includes identification information about the first vehicle or an occupant of the first vehicle in association with the first object data.

4. The method of claim 1, wherein the server is an infrastructure station in communication with a central server.

5. The method of claim 2, further comprising:
classifying the second object data as relevant or non-relevant based on a second user profile associated with the second vehicle;
wherein the second object data is transmitted to the server in response to classifying the second object data as relevant.

6. The method of claim 1, further comprising adjusting a first user profile based on a detected gaze of an occupant of the first vehicle.

7. The method of claim 1, further comprising adjusting a first user profile based on an instruction from an occupant of the first vehicle.

8. The method of claim 1, further comprising determining an event based on the first object data.

9. A vehicle comprising:
a controller including one or more processors and one or more memory modules including machine readable instructions that, when executed by the one or more processors, cause the controller to:
capture first object data; and
transmit the first object data to a server which is configured to:
compare the first object data with second object data captured by a second vehicle to determine whether the first object data and the second object data include redundant object data; and
in response to determining that the first object data and the second object data include redundant object data, discard the redundant object data from a transmission package.

10. The vehicle of claim 9, wherein the machine readable instructions further cause the controller to:
classify the object data as relevant or non-relevant based on a user profile associated with an occupant of the vehicle,
wherein the first object data is transmitted to the server in response to classifying the first object data as relevant.

11. The vehicle of claim 9, wherein the server is an infrastructure station in communication with a central server.

12. The vehicle of claim 9, wherein the controller is further configured to adjust a user profile based on a detected gaze of an occupant of the vehicle.

13. The vehicle of claim 9, wherein the controller is further configured to adjust a user profile based on an instruction from an occupant of the vehicle.

14. A communication system comprising:
an infrastructure station including a first controller, the first controller including one or more processors and one or more memory modules including machine readable instructions that, when executed by the one or more processors, cause the first controller to:
receive first object data from a first vehicle;
receive second object data from a second vehicle;
compare the first object data and the second object data to determine whether the first object data and the second object data include redundant object data; and
in response to determining that the first object data and the second object data include redundant object data, discard the redundant object data from a transmission package.

15. The communication system of claim 14, further comprising:
a central server including a second controller, the central server in communication with the infrastructure station,
wherein the first controller of the infrastructure station is configured to transmit the transmission package to the central server.

16. The communication system of claim 15, wherein the second controller of the central server is further configured to determine an event based on the transmission package.

17. The communication system of claim 16, wherein the event is a high-traffic-pedestrian area.

18. The communication system of claim 15, wherein the second controller of the central server is further configured to:
receive a request for data from the first object data from a device; and
transmit the data from the first object data to the device.

19. The communication system of claim 18, wherein the data includes one or more of audio data and video data.

* * * * *

UNITED STATES PATENT AND TRADEMARK OFFICE
CERTIFICATE OF CORRECTION

PATENT NO. : 12,277,776 B2  
APPLICATION NO. : 17/145717  
DATED : April 15, 2025  
INVENTOR(S) : Masashi Nakagawa Page 1 of 1

It is certified that error appears in the above-identified patent and that said Letters Patent is hereby corrected as shown below:

In the Specification

In Column 2, Line(s) 31, delete "classified" and insert --classifying--, therefor.

In Column 3, Line(s) 4, delete "embodiment," and insert --embodiments,--, therefor.

Signed and Sealed this  
Twenty-fourth Day of June, 2025

Coke Morgan Stewart  
*Acting Director of the United States Patent and Trademark Office*